(12) United States Patent
Eberlein

(10) Patent No.: US 11,409,719 B2
(45) Date of Patent: Aug. 9, 2022

(54) CO-LOCATING MICROSERVICE PERSISTENCE CONTAINERS WITHIN TENANT-SPECIFIC DATABASE

(71) Applicant: SAP SE, Walldorf (DE)

(72) Inventor: Peter Eberlein, Malsch (DE)

(73) Assignee: SAP SE, Walldorf (DE)

( * ) Notice: Subject to any disclaimer, the term of this patent is extended or adjusted under 35 U.S.C. 154(b) by 561 days.

(21) Appl. No.: 15/661,849

(22) Filed: Jul. 27, 2017

(65) Prior Publication Data
US 2019/0034460 A1 Jan. 31, 2019

(51) Int. Cl.
| | |
|---|---|
| *G06F 7/00* | (2006.01) |
| *G06F 16/21* | (2019.01) |
| *H04L 41/5041* | (2022.01) |
| *H04L 41/50* | (2022.01) |
| *G06F 16/28* | (2019.01) |

(52) U.S. Cl.
CPC .......... *G06F 16/213* (2019.01); *G06F 16/285* (2019.01); *H04L 41/5041* (2013.01); *H04L 41/5096* (2013.01)

(58) Field of Classification Search
CPC . G06F 16/213; G06F 16/285; H04L 41/5041; H04L 41/5096
USPC ......................................... 707/600, 736, 737
See application file for complete search history.

(56) References Cited

U.S. PATENT DOCUMENTS

| | | | | |
|---|---|---|---|---|
| 8,291,490 B1* | 10/2012 | Ahmed | ................ | G06F 21/604 726/17 |
| 2014/0074973 A1* | 3/2014 | Kumar | .................... | H04L 67/32 709/217 |
| 2014/0075031 A1* | 3/2014 | Doering | .............. | H04L 41/5041 709/226 |

OTHER PUBLICATIONS

Peter Eberlein, Pending U.S. Appl. No. 15/356,190, filed Nov. 18, 2016.

\* cited by examiner

*Primary Examiner* — Md I Uddin
(74) *Attorney, Agent, or Firm* — Fountainhead Law Group P.C.

(57) ABSTRACT

A platform's central instance manager (IM) receives microservice requests issued to a common application shared between various tenants. Embodiments function to co-locate within a same database, the persistence containers of different microservice instances of a specific tenant. The central IM associates a corresponding tenant identifier with microservice request instances created. Referencing this assigned tenant identifier, the central IM maintains an external configuration file comprising a mapping of services (m) and tenants (n), to relevant persistence container service instances. Such mapping permits the allocation of tenant-specific microservice data for storage within persistence containers of a particular database. This co-location of data promotes flexibility, allowing tenants to furnish database structures tailored to their individual needs. Consolidating microservice persistence containers within a tenant-specific database may also facilitate: the efficient backup of data, the isolation of individual tenant data for security purposes, and/or the provision of access to individual tenant data by extension application(s).

10 Claims, 10 Drawing Sheets

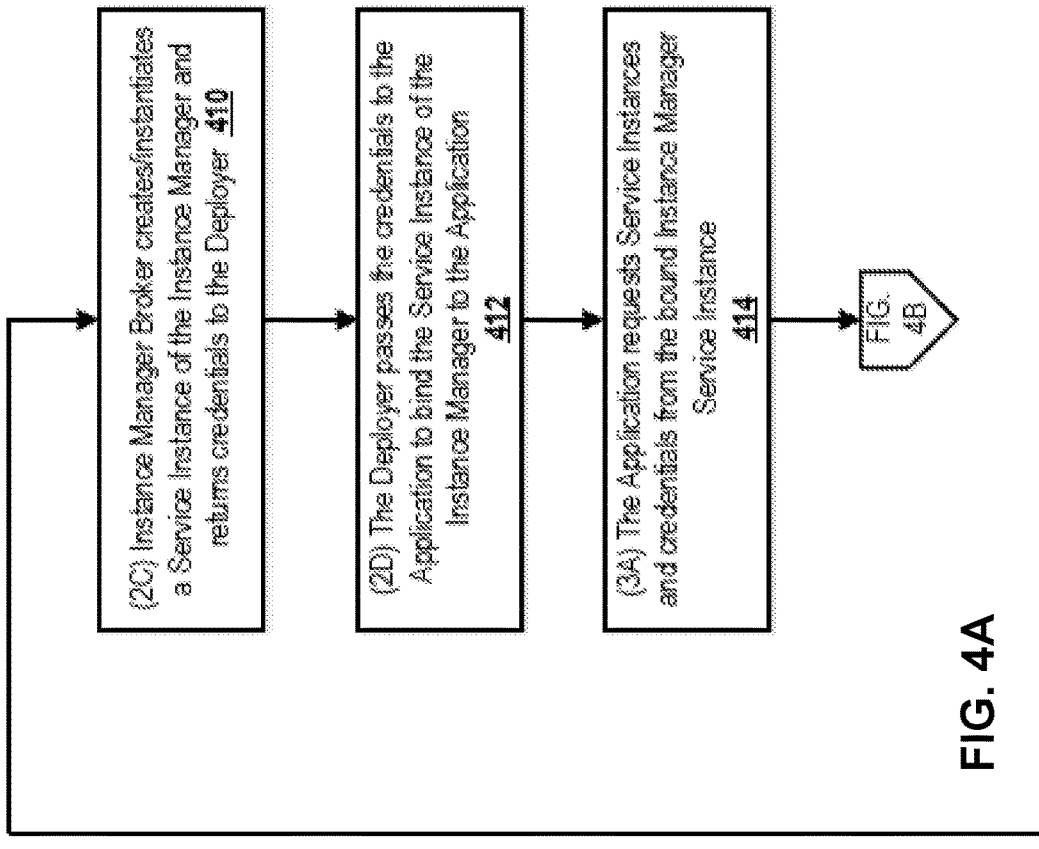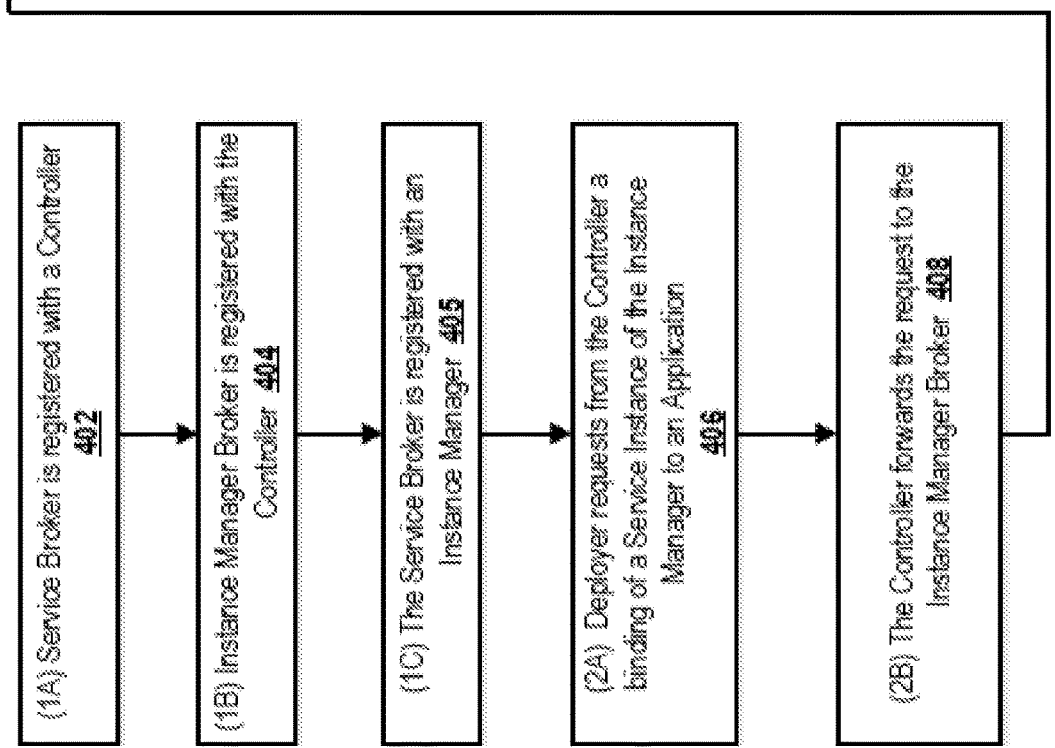
FIG. 4A

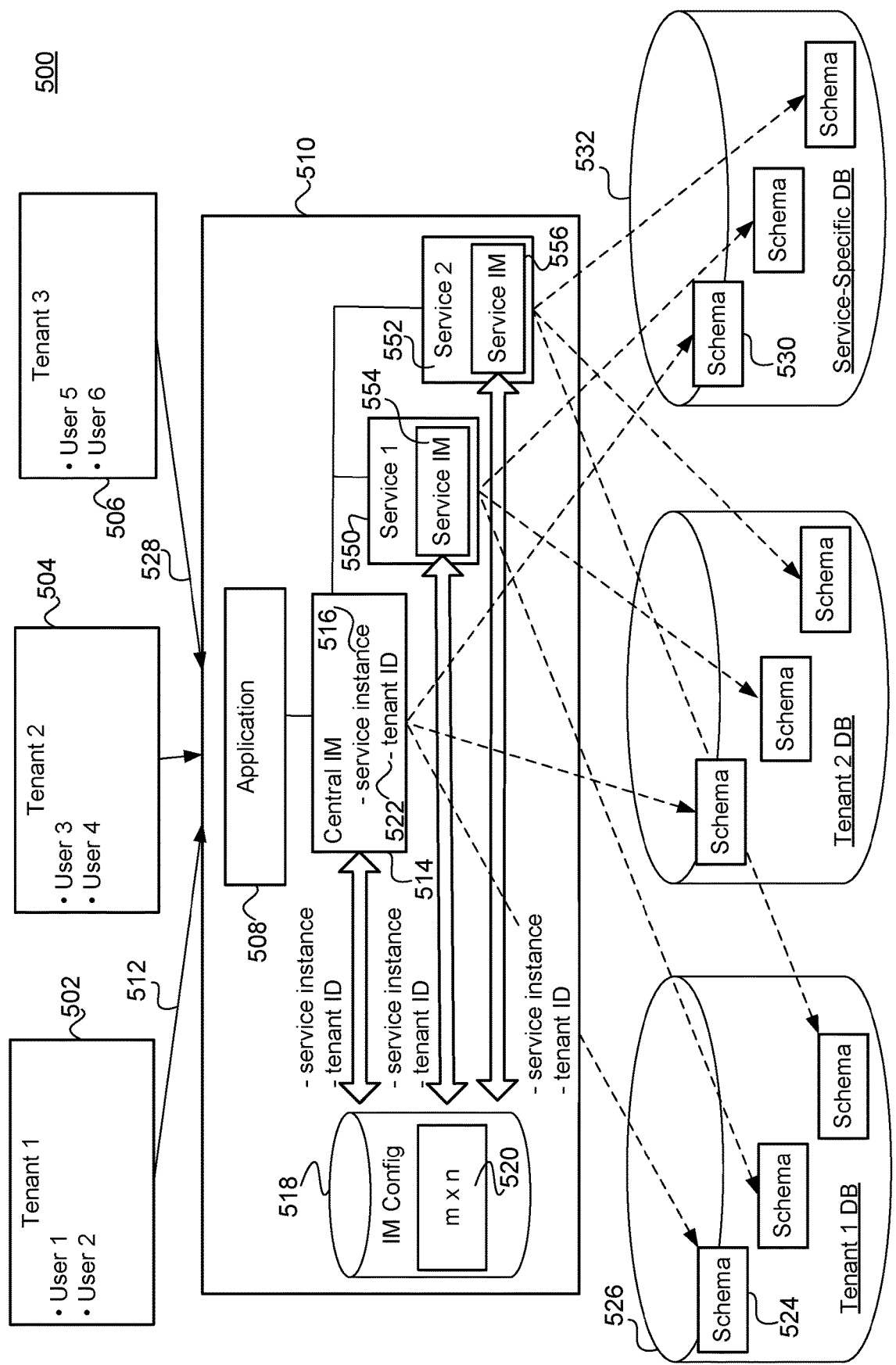

CO-LOCATING MICROSERVICE PERSISTENCE CONTAINERS WITHIN TENANT-SPECIFIC DATABASE

BACKGROUND

Unless otherwise indicated herein, the approaches described in this section are not prior art to the claims in this application and are not admitted to be prior art by inclusion in this section.

Microservice-oriented application platforms (for example, XS ADVANCED or underlying CLOUD FOUNDARY PaaS) manage services as resources that are instantiated and bound at deployment time by an application operator. For multi-tenancy capable applications that leverage service instances (such as schemas in some database) for tenant separation (for example, each tenant stores its data in a separate schema), this static binding is not sufficient and an instance manager can be used to create additional instances at runtime whenever a new tenant is added and also to connect to any one of these instances when processing a request for a specific tenant.

SUMMARY

Embodiments relate to methods and apparatuses that co-locate persistence containers of different microservices of a specific tenant, within a same database. A central instance manager (IM) receives microservice requests from a common application that is shared between various tenants. The central IM associates a corresponding tenant identifier with the microservice requests. Referencing this assigned tenant identifier, the central IM maintains an external configuration file comprising a two-dimensional mapping of services (m) and tenants (n), to relevant persistence container service instances. Such mapping permits the allocation of tenant-specific microservice data for storage within persistence containers of a particular database. Co-locating data according to embodiments promotes flexibility: tenants may furnish database structures tailored to their own individual needs. Consolidating microservice persistence containers within a tenant-specific database may also facilitate one or more of: the consistent and efficient backup of data, the isolation of individual tenant data for security purposes, and/or the provision of access to individual tenant data by outside extension application(s).

An embodiment of a computer-implemented method comprises, receiving a service request from one of a plurality of tenants sharing an application, and instantiating a service instance from the service request. The method further comprises determining from a tenant identifier associated with the service request and a configuration file including a mapping, whether a tenant-specific database is configured with the one of the plurality of tenants. If the tenant-specific database is determined to be configured with the one of the plurality of tenants, the service instance is stored in a first schema of the tenant-specific database. If the tenant-specific database is determined to not be configured with the one of the plurality of tenants, the service instance is stored in a second schema of a service-specific database.

Certain embodiments further comprise associating the tenant identifier with the service request.

In some embodiments the tenant-specific database comprises an in-memory database, and the associating is performed by an engine of the in-memory database.

According to various embodiments the configuration file is stored in the tenant-specific database.

In particular embodiments the configuration file is stored outside the tenant-specific database.

According to certain embodiments the configuration file is stored in the service-specific database.

In some embodiments the tenant-specific database comprises an in-memory database.

In various embodiments the determining is performed by an engine of the in-memory database.

According to particular embodiments the method further comprises an engine of the in-memory database granting to an outside extension application, access to the first schema.

In some embodiments the service-specific database comprises an in-memory database, and the determining is performed by an engine of the in-memory database.

According to various embodiments instantiating the service instance comprises calling a representational state transfer (REST) application program interface (API).

A non-transitory computer readable storage medium embodies a computer program for performing a method comprising receiving a service request from one of a plurality of tenants sharing an application, and instantiating a service instance from the service request. The method also comprises associating a tenant identifier with the service instance. The method further comprises determining from the tenant identifier and a configuration file including a mapping, whether a tenant-specific database is configured with the one of the plurality of tenants. If the tenant-specific database is determined to be configured with the one of the plurality of tenants, the service instance is stored in a first schema of the tenant-specific database. If the tenant-specific database is determined to not be configured with the one of the plurality of tenants, the service instance is stored in a second schema of a service-specific database.

An embodiment of a computer system comprises one or more processors and a software program executable on said computer system. The software program is configured to cause an in-memory database engine to receive a service request from one of a plurality of tenants sharing an application, and to instantiate a service instance from the service request. The software program is further configured to cause the in-memory database engine to determine, from a tenant identifier associated with the service request and a configuration file including a mapping, whether a tenant-specific database is configured with the one of the plurality of tenants. If the tenant-specific database is determined to be configured with the one of the plurality of tenants, the service instance is stored in a first schema of the tenant-specific database. If the tenant-specific database is determined to not be configured with the one of the plurality of tenants, the service instance is stored in a second schema of a service-specific database.

The following detailed description and accompanying drawings provide a better understanding of the nature and advantages of embodiments.

BRIEF DESCRIPTION OF THE DRAWINGS

FIGS. 4A-4B represent a flowchart illustrating an example method for application service instance management with an instance manager and instance manager broker, according to an implementation.

FIG. 5 shows a simplified diagram of a system according to an embodiment.

DETAILED DESCRIPTION

Figure 1:
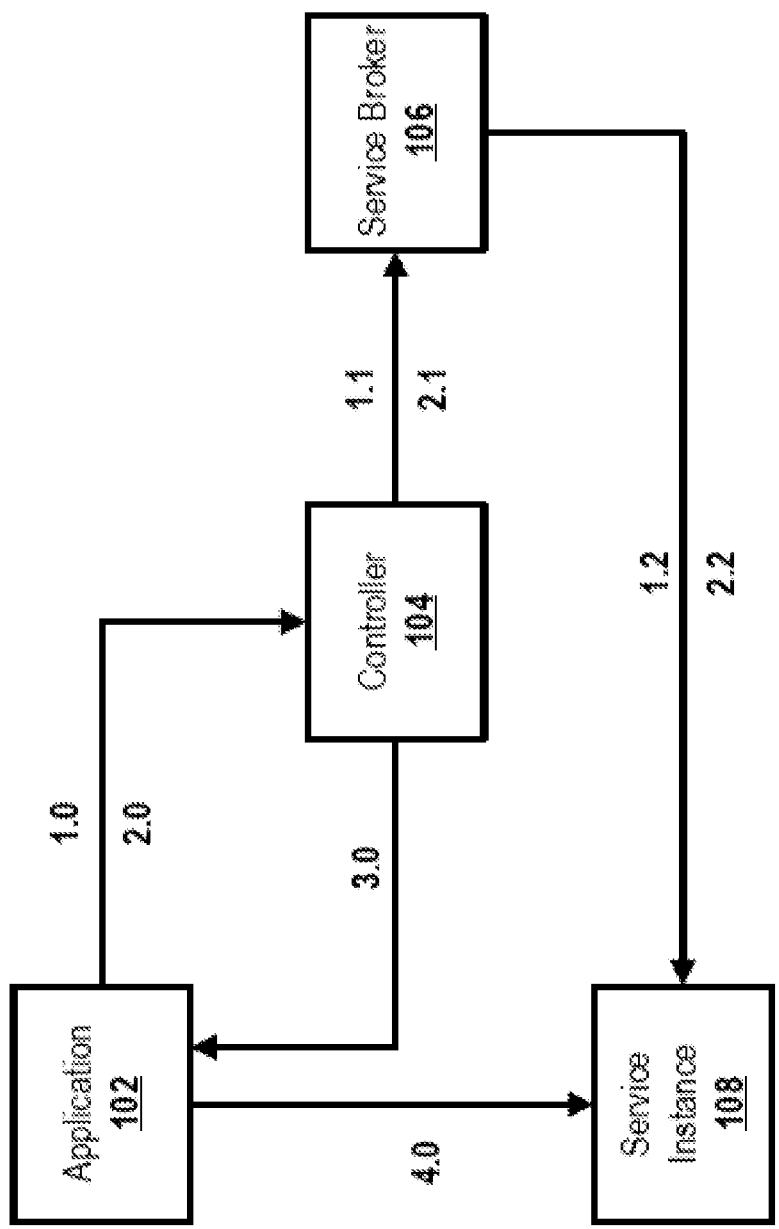
FIG. 1 is a block diagram illustrating current static component/data relationships for application service instance management with a service broker, according to an implementation.

Described herein are methods and apparatuses implementing co-location of microservice persistence containers in a tenant database. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Because users expect a rich, interactive, and dynamic experience, an online or network-available, multi-tenancy-capable (MTC) software application (hereinafter, "Application") must be scalable, have minimal downtime, and be cloud-computing-environment enabled. Monolithic Applications cannot meet these requirements. However, in a microservices architecture (MSA), an Application is typically split into a number of individually-deployable, narrowly-focused, re-usable, fault-tolerant software services (hereinafter, "Services") (which can each also be broken down into additional supporting sub-Services) organized around capabilities (for example, a database persistence Service, email sending Service, job scheduling Service, user interface management Service, and other Services). Services can be implemented in various software/hardware environments, databases, programming languages, etc. as an interface is used to call particular Services. As a change to a small part of the Application requires only one or a small number of Services to be rebuilt and redeployed, a MSA is naturally modular and allows for a more continuous-delivery-type software development process.

A Service binding (for example, a set of key/value pairs containing a Service URL and access credentials) is normally used by a particular Application to make the Application aware of data/interface requirements needed to interact with each of the various Services. MSA Application platforms (for example, SAP HANA XS ADVANCED or underlying CLOUD FOUNDARY Platform-as-a-Service (PaaS)) manage Services as resources that are instantiated and bound at deployment time by a Deployer (for example, a third-party or application developer/administrator). This is an appropriate model for Applications that only require a fixed number of Service Instances (typically one) of a particular type, such as a schema in a database.

However, for Applications that leverage separation of instances of a Service (hereinafter, "Service Instances") for a tenant (hereinafter, "Tenant") (for example, each Tenant stores its data in a separate database schema), this type of static binding is not sufficient. Such Applications need to be able to create additional Service Instances dynamically at runtime whenever a new Tenant is added (or onboarded) to a cloud-computing-type environment and also need to connect to any one of these Service Instances when processing a request applicable to a specific Tenant. When a new Tenant subscribes to an Application, the Application is made aware by an onboarding process that the Tenant is new and the Application receives a chance to prepare provision of its services to the Tenant.

In order to provide for these requirements, an Instance Manager Broker and Instance Manager component is introduced. The Instance Manager exposes a representational state transfer (REST) application programming interface (API) that is accessible by an Application using a service binding to an Instance Manager instance to create actual Service Instances or to retrieve credentials to a specific Service Instance that the Instance Manager manages (for example, during onboarding, the Application can make a request to a Service Instance of the Instance Manager to dynamically create one or more Service Instances). The Instance Manager builds on functionality of a Service Broker that handles static instance creation and binding by providing Applications with an ability to also dynamically manage Service Instances.

In current implementations, at a high-level, before an Application is deployed, a Service Instance for an Application is created, typically by a Deployer. Here, a request is sent to a Controller to create an instance of a given Service associated with a given Service Plan (see below). The Controller forwards this request to a service-type-specific Service Broker that creates a new Service Instance as requested. Then, the Service Instance can be bound to the Application with another request (for example, sent by the Deployer) that is forwarded from the Controller to the Service Broker where appropriate credentials for accessing the Service Instance are created. These credentials are then provided to the Application (for example, in environment variables) when the Application is started so that the Application has the required information to access the Service Instance. With this approach the Application is statically bound to the Service Instance that it uses during Application runtime.

In order to allow Applications to create additional Service Instances dynamically at runtime whenever a new Tenant is onboarded and to connect to any one of these Service Instances when processing a request for a particular Tenant, the above-mentioned Instance Manager can be created by an Instance Manager Broker and bound to the Application in the same way as regular Service Instances are created and bound in the above-described current implementation. Note that creation and binding happens in the same way as current implementations from the perspective of a Service's Service Broker. However, from an Application's perspective there is a difference—the Application does not access credentials created during binding from its environment variables, but rather the Application receives these credentials dynamically as a result of a REST call to an Instance Manager. At a high-level, in this architecture and methodology, a request is sent to the Controller (for example, by a Deployer) to create a Service Instance of type Instance Manager. The request is forwarded to an Instance Manager Broker that creates a Service Instance of the Instance Manager.

The Instance Manager itself is considered a Service that exposes a REST API that can be accessed by the Application using a service binding to a particular Instance Manager instance to create actual Service Instances or to retrieve credentials to a specific Service Instance that the Instance Manager manages. As the Instance Manager provides this access directly through APIs that are called at runtime, the Application can dynamically bind to any Service Instance managed by the Instance Manager. The Application-Managed-Service-Instances concept leverages functionality provided by existing Service Brokers for Service Instance creation and binding to provide dynamic Service Instance provisioning for multi-tenancy and other use cases; leveraging existing Service Broker interfaces to provide services through a REST API that applications can consume at runtime.

One example of a high-level flow of actions for a multi-tenancy enabled application can be: When the Application is started, the Application receives credentials for an Instance Manager instance, not for an actual Service Instance. With these credentials, the Application invokes Services provided by the Instance Manager for creating new actual Service Instances whenever a new Tenant is added to the Application. When a Tenant uses the Application and access to an actual Service Instance is required, the Application invokes another Service of the Instance Manager that dynamically returns the credentials to the Tenant's actual Service Instance based, for example, on a Tenant identifier that can be provided when the Service Instance was originally created. With the returned credentials, the Application can then connect to actual Service Instances, dynamically switching between available Service Instances as required for processing requests for specific Tenants. In typical implementations, Service Instance credentials can be cached and open connections can be pooled to minimize overhead created by additional calls to the Instance Manager.

The Instance Manager is itself considered a managed service, but, to the actual Service Broker, the Instance Manager acts as an additional Controller (that is, the actual Service Broker needs to be registered at the Instance Manager so the Instance Manager can manage Services brokered by the actual Service Broker). For each Service and Service Plan that an actual Service Broker wishes to expose using the Instance Manager, the Instance Manager Broker creates a corresponding managed Service and managed Service Plan (for example, but not limited to, "prefixing the service name with "managed_"). For example, for an SAP HANA database Service Broker, there could be Services and Plans similar to those shown in Table 1:

TABLE 1

| Service | Plan | Managed Service | Managed Plan |
| --- | --- | --- | --- |
| hana | hdi-shared | managed_hana | hdi-shared |
| hana | sbss | | |
| hana | schema | managed_hana | schema |
| hana | securestore | managed_hana | securestore |

Note that in this example the sbss plan (statically bound) is not exposed through the Instance Manager as the Instance Manager is used for dynamic binding and there is no corresponding "managed" version of the "sbss" Service Plan. On the other hand, the "hdi-shared," "schema," and "securestore" Service Plans can be exposed through the Instance Manager.

Service Plans are defined by Service Brokers. When a Service Broker is registered with a Controller, the Controller calls a Service Broker API to retrieve a Service Catalog. The Service Catalog lists all Services and Service Plans that are provided by the Service Broker. Once the Service Broker has been registered, the Controller stores these Services and Service Plans so that the Controller can provide the list to consumers (for example, in the regular case to the Deployer, who can use a command line interface to get a listing of all Services and Service Plans of all Service Brokers; or in combination with an Instance Manager, the Instance Manager validates requests from Applications for specific Services and Service Plans to determine which Service Broker the requests should be forwarded to and if the requested Service Plan is supported).

In typical implementations, one Instance Manager can manage any number of Services and Service Plans provided by other Service Brokers. The Instance Manager uses a standard Service Broker API to acquire the above-mentioned Service catalog of Services and Service Plans when an additional Service Broker is registered with the Instance Manager. An additionally provided parameter to the Instance Manager can be used as a filter to make a list of Services and Service Plans available through the Instance Manager to not include Services and Service Plans that should not be made available through the Instance Manager (for example, the "sbss" Plan above in Table 1. The Instance Manager can also use Service Broker APIs to create, update, delete, etc. Service Instances and bindings when an Application invokes the Instance Manager APIs to request corresponding actions.

FIG. 1 is a block diagram illustrating component/data relationships 100 for current static Application Service Instance management with a Service Broker, according to an implementation. FIG. 1 is provided for example purposes only to enhance understanding of the presented concepts. As will be appreciated for those of ordinary skill in the art, there are a myriad of other ways to present or arrange the presented components, structure their interactions, describe inter/intra-component interactions/communications, etc. In as far as they are consistent with this disclosure, these other possible orientations, arrangements, etc. are considered to be within the scope of this disclosure.

At a high-level and in current static implementations of Service Instance management, a generic middleman-type Controller 104 component is used to create an instance of a Service (for example, Service Instance 108) for an Application 102. The Controller 104 is used to call a Service Broker 106 component which creates and obtains binding credentials (for example, a Service binding as described above) for the requested Service Instance. The binding credentials are passed to the Controller 104 and used to bind the Application 102 to the Service Instance 108 using the binding credentials. Note that numbers associated with connecting arrows in FIG. 1 (for example, 1.0, 1.1, 1.2, etc.) are used in FIG. 2 for referential purposes to tie together the corresponding relationships between components).

Application 102 is a software application (for example, a MTC Application as described above) that implements execution logic and leverages a shared Service that lives outside of its own implementation. Although the Service is shared, each application has one (or more) isolated space(s) in the Service referred to as Service Instance(s) 108. A Service Instance 108 is a space within a shared Service provided to an Application 102. In the example of a database Service, the Service can be considered the database system and the Service Instance 108 can be considered a database schema in that database system.

Service Broker 106 manages (or brokers) the Service Instances of a shared Service. There is a Service Broker 106 associated with each Service type, but each Service Broker can manage multiple Service types. The Service Broker 106 is configured to create an instance of a specific Service and is able to provide connection parameters and credentials to Applications 102 that need to access a Service Instance 108.

Controller 104 is the middleman between Applications 108 and Service Brokers 106. The Controller 104 is aware of all Service Brokers 106 available in a system and mediates requests from Applications 102 requesting Service Instances 108 of a specific type to the appropriate Service Broker 106. In some implementations, the Controller 104 can also cache connection parameters and credentials provided by a Service Broker 106 so that repeated binding requests from an Application 102 to the same Service Instance 108 can be processed without a need to repeatedly query the Service Broker 106.

Figure 2:
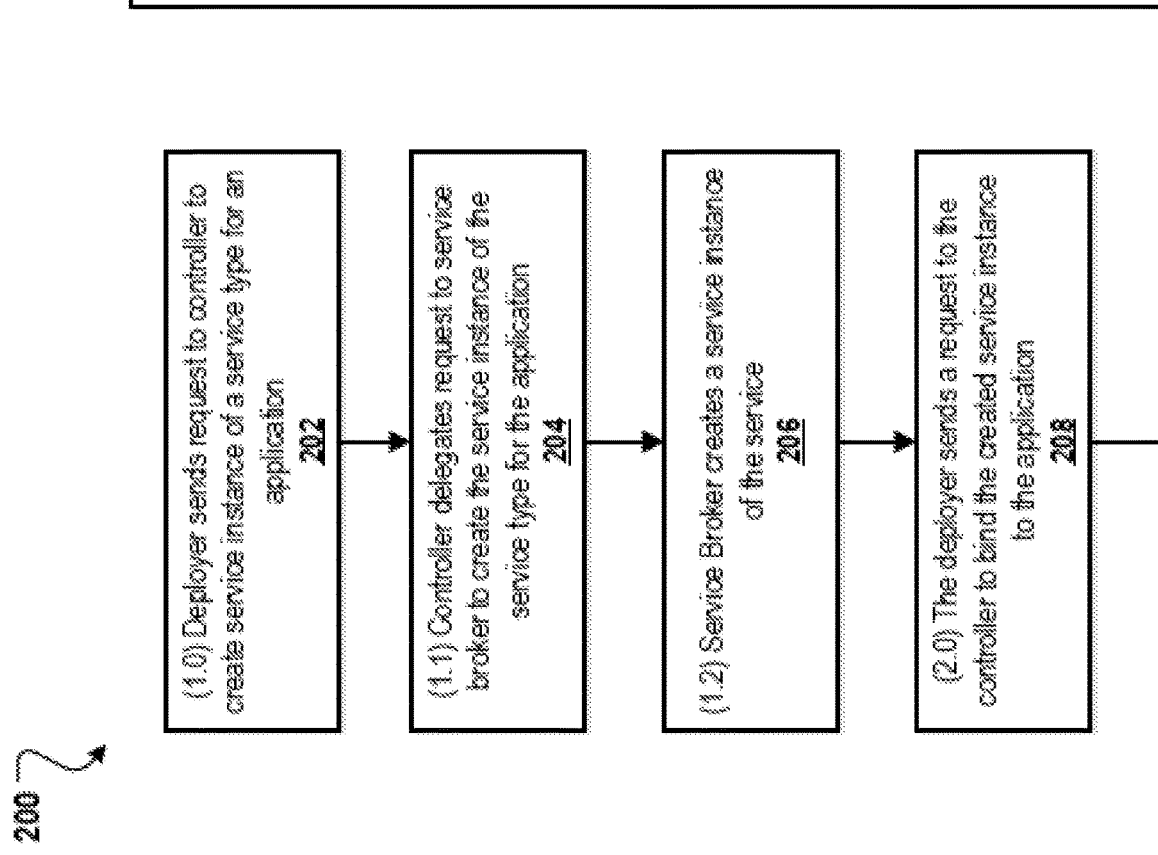
FIG. 2 is a flowchart of an example method for current static application service instance management with a service broker, according to an implementation.

FIG. 2 is a flowchart of an example method 200 for current static Application Service Instance management with a Service Broker, according to an implementation. For clarity of presentation, the description that follows generally describes method 200 in the context of the other figures in this description. However, it will be understood that method 200 may be performed, for example, by any suitable system, environment, software, and hardware, or a combination of systems, environments, software, and hardware as appropriate. In some implementations, various steps of method 200 can be run in parallel, in combination, in loops, or in any order.

At 202, (1.0) before an Application is deployed, a Service Instance 108 of a Service is created and bound to the Application 102 by a request sent by a Deployer (not illustrated) to a Controller 104 to create Service Instance 108 of a Service type for the Application 102. For example, each Application 102 can have a Service Plan (not illustrated)—data that describes what services each Application should/are allowed to use. Service Plans are typically stored in an accessible location by the Service Broker 106. The Controller 104 can query the Service Broker 106 for a list of available Service Plans available to the particular Application 102.

In the static case example of FIGS. 1 & 2, a Deployer (not illustrated) and not an Application 102 itself creates and binds the Service Instance 108 to the Application 102. In typical implementations, a Service Plan that an Application requests is stored in a deployment descriptor file that is included with the Application and used by the Deployer to create the correct instance. The Deployer can read an Application-defined Service Plan that is requested and tell the Controller 104 what Service(s) 108 that the Application 102 wishes to use for various functions. Logically, this is done on behalf of the Application 102 (in this and corresponding steps of method 200). For reasons of simplicity, in the provided example of FIGS. 1 & 2, a corresponding arrow (1.0) for the request sent to the Controller 104 is illustrated as starting at the Application 102. Technically these steps are not typically implemented inside of the Application 102 itself.

Each Application 102 can receive information related to a Service Instance 108. For example, in the case of a database, five different Applications 102 can use the same database, but there would be five separate Service Instances 108 created (in the database context, each Application 102 would receive their own schema as to not interfere with each other). From 202, method 200 proceeds to 204.

At 204, (1.1) the Controller 104 delegates the Deployer service request to a Service Broker 106 to create the Service Instance 108 of the Service type for the Application 102.

Here, the Controller 104 calls the Service Broker 106 (typically each Service type has its own Service Broker 106). At a lower-level, the Controller 104 calls an interface (not illustrated) for a particular Service Broker 106 as the Controller 104 is configured with knowledge of the type of Service that is needed. Data describing particulars of the interface called can be swapped depending upon the type of Service needed. For example, if it is desired to switch database types, version, etc., a data structure describing the database that the Controller 104 should use to initiate generation of a database Service can be modified and the Controller 104 will call the updated interface information of an appropriate Service Broker 106. From 204, method 200 proceeds to 206.

At 206, (1.2) the Service Broker 106 creates (or initiates creation of) a Service Instance 108 of the Service type (for example, a Service to create a database schema). Binding credentials are obtained by the Service Broker 106. From 206, method 200 proceeds to 208.

At 208, (2.0) the Deployer sends a request to the Controller 104 to bind the created Service Instance 108 to the Application 102. From 208, method 200 proceeds to 210.

At 210, (2.1) the Controller 104 delegates the binding request to the Service Broker 106 to bind the Service Instance 108 to the Application 102. From 210, method 200 proceeds to 212.

At 212, (2.2) the Service Broker 106 creates Service Instance credentials (not illustrated) for the Application 102 (for example, create a database user with access to an associated database schema) and returns the Service Instance credentials to the Controller 104. From 212, method 200 proceeds to 214.

At 214, (3.0) the Controller 104 provides the Service Instance credentials to the Application 102 to bind the Service Instance 108 to the Application 102. For example, in one implementation, the Controller 104 can inject parameters/credentials into the environment variables of the Application 102 to effect the binding. From 214, method 200 proceeds to 216.

At 216, (4.0) the Application 102 is started and can use the Service Instance credentials to access the bound Service Instance 108. With this approach, the Application 102 is statically bound to the particular Service Instance 108 that can be used during the runtime of Application 102. In this example, if the particular Service Instance 108 crashes or is rendered somehow unreachable by the Application 102, the Application 102 has no ability to use a different Service Instance 108 as it is tied to the one that failed. From 216, method 200 stops.

Enhanced Functionality Through an Instance Manager/Instance Manager Broker

In the case of an application (for example, Application 102) that can be used by more than one customer in a cloud-computing-type environment, the implementation described with respect to FIGS. 1 & 2 is insufficient. When a user (for example, a Tenant) logs into the Application 102 in a cloud-computing-type environment, the user is associated with a Tenant identifier (for example, a digitally signed ticket associated with the Tenant) and used by the Application 102 to access and retrieve data for the Tenant. While it is possible in some implementations to configure, for example, a database to identify tables as associated with a particular customer/Tenant (for example, using a value in each query that is uniquely associated the particular customer/Tenant when operating on database tables of a database schema), extensibility, customization, etc. are impacted as changes needed for one Tenant end up impacting all Tenants (for example, a Tenant wants to extend a database table by adding a field—this action increases the size of a database, can impact database performance, etc.). In a multi-tenancy environment, what is needed is for the same Application 102 to be able to dynamically use multiple/ different Service Instances (for example, database schemas), each appropriate for a different Tenant without the Application 102 needing to be deployed multiple times (that is, each particular Application 102 deployment for a particular Tenant). Instead of directly binding an Application 102 to a Service Instance 108, an indirection is performed to bind the Application to an Instance Manager which offers APIs to particular Service Instances 108 (for example, database schemas). The Application 102 can call the Instance Manager to dynamically gain access to Service Instances 108.

Figure 3:
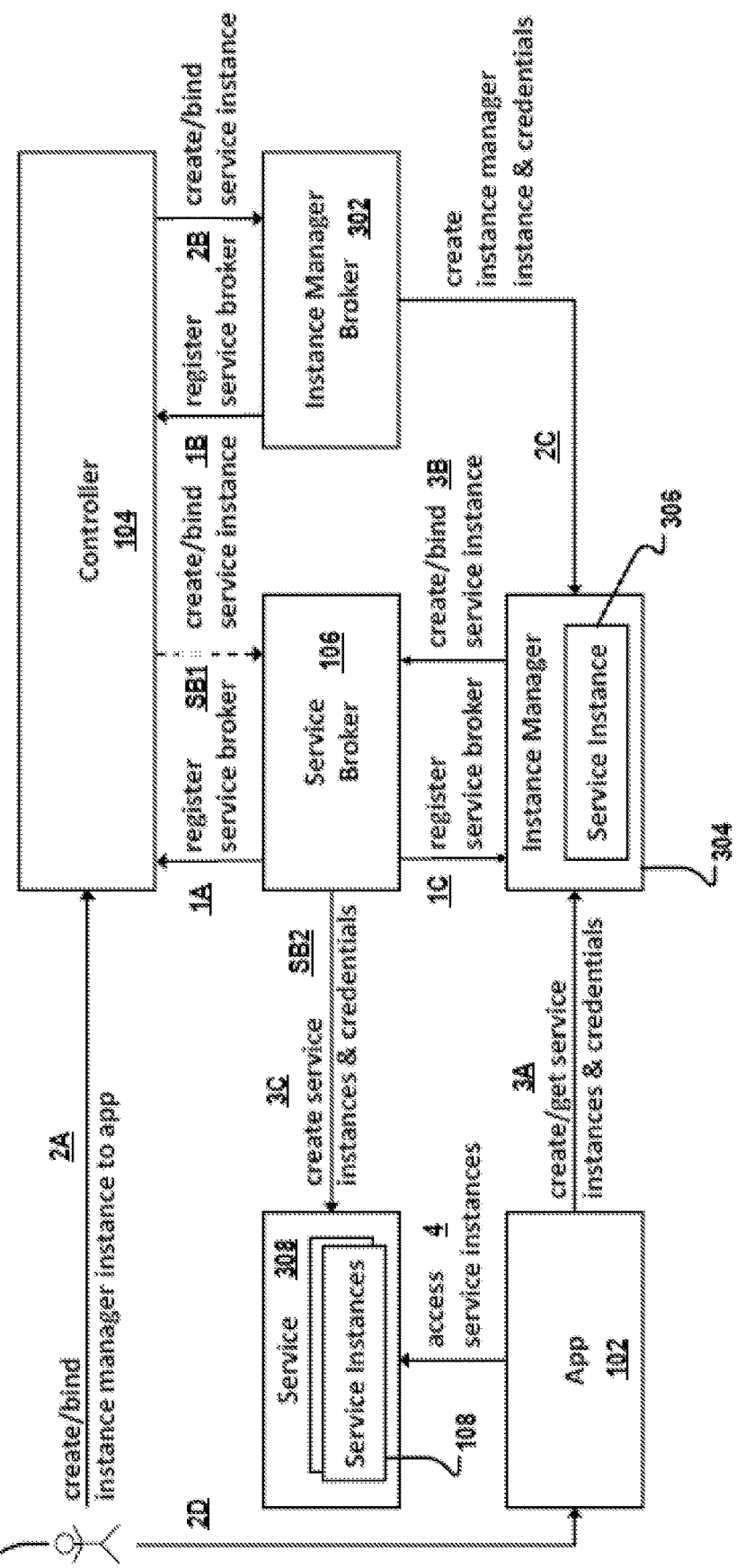
FIG. 3 is a block diagram illustrating component/data relationships for application service instance management with an instance manager broker and instance manager, according to an implementation.

FIG. 3 is a block diagram 300 illustrating component/data relationships for application service instance management with an Instance Manager Broker and Instance Manager, according to an implementation. Note that FIG. 1 is provided for example purposes only to enhance understanding of the presented concepts. As will be appreciated for those of ordinary skill in the art, there are a myriad of other ways to present or arrange the presented components, structure their interactions, describe inter/intra-component interactions/communications, etc. In as far as they are consistent with this disclosure, these other possible orientations, arrangements, etc. are considered to be within the scope of this disclosure.

To enhance the functionality of FIGS. 1 & 2, Service Broker 106 functionality is extended, without modification (or substantive modification) of the Service Broker 106 by introducing an Instance Manager Broker 302 and Instance Manager 304 component for application managed service instances. Instead of creating and binding an actual service instance to the Application 102, a Service Instance 306 of an Instance Manager 304 can be created by a call to an Instance Manager Broker 302. The Service Instance 306 can be bound to the Application 102 in the same way as regular Service Instances (for example, Service Instances 108 of FIGS. 1 & 2) are created and bound. Note that functionality described above with respect to FIGS. 1 & 2 can also be available to components of FIGS. 3 & 4A-4C (for example, the Controller 104 can access Service Plans stored by the Service Broker 106 similar to the description above with respect to Controller 104 and Service Broker 106). In some implementations, corresponding components between FIGS. 1 and 3 can share some or all of the same functionality.

At a high-level, both a Service Broker 106 and an Instance Manager Broker 302 are registered with a Controller 104. After the registrations, the Controller 104 offers to a developer Services from the two different brokers for use by an Application 102 (the developer can instantiate Services using either the Service Broker 106 or the Instance Manager Broker 302).

The Service Broker 106 is also registered with the Instance Manager 304. Here, the Service Broker 106 is technically registered to another Controller (here Instance Manager 304). This also means that if another particular Service 308 needs to be made available/managed, a Service Broker 106 associated with that particular Service 308 would simply register itself with the Instance Manager 304. As a result, the Instance Manager 304 is aware of available Services 308 and Service Instances 108.

The Service Broker 106 provides access to a Service Instance 108 of a Service 308 and the Instance Manager Broker 302 provides access to a Service Instance 306 of an Instance Manager 304. Note that the Instance Manager 304 acts both as a Service from the point-of-view of the Controller 104 but as a different Controller component from the point-of-view of the Service Broker 106. Service 308 is an example service to be brokered and is brokered through the Service Broker 106 while the Instance Manager 304 (as a Service) is brokered through the Instance Manager Broker 302. A developer can use the Service Broker 106 to bind a Service Instance 108 of Service 308 statically to an Application 102 (for example and as described above, following SB1 from Controller 104 to Service Broker 106 and SB2 from Service Broker 106 to Service 308 to return credentials for a created Service Instance 108 which is statically bound to Application 102), while the Instance Manager Broker 302 can be used to bind a Service Instance 306 of the Instance Manager 304 to an5 Application 102 to allow dynamic allocation of Service Instances 108 of Service 308 to Application 102.

A Deployer 101 requests a static binding of a Service Instance 306 of the Instance Manager 304 to the Application 102 by sending a request to the Controller 104. Controller 104 forwards the request to the Instance Manager Broker 302. The Instance Manager Broker 302 creates/instantiates the Service Instance 306 of the Instance Manager 304 and returns credentials of the Service Instance 306 to the Deployer 101. Deployer 101 passes the credentials received from the Controller 104/Instance Manager Broker 302 to Application 102. The credentials are used to bind the Service Instance 306 to the Application 102.

When the Application 102 starts, the Application 102 can use the statically bound Service Instance 306 of the Instance Manager 304 to request a Service Instance 108 of a Service 308. The Application 102 requests that the Service Instance 306 of the Instance Manager 304 create a service instance 108. This is an example of a dynamic REST call from the Application 102 when, for example, a new Tenant is onboarded. The Service Instance 306 forwards the request to the Service Broker 106. The Service Broker 106 creates/instantiates a Service Instance 108 of a Service 308 and returns credentials (for example, for a database the credentials could include a database schema, technical user of the database, password to the database, etc.) of the Service Instance 108 to the Instance Manager Service Instance 306 (here acting as a calling Controller) which returns the credentials to the Application 102. Application 102 accesses the service instance 108 using the received credentials.

Figure 4B:
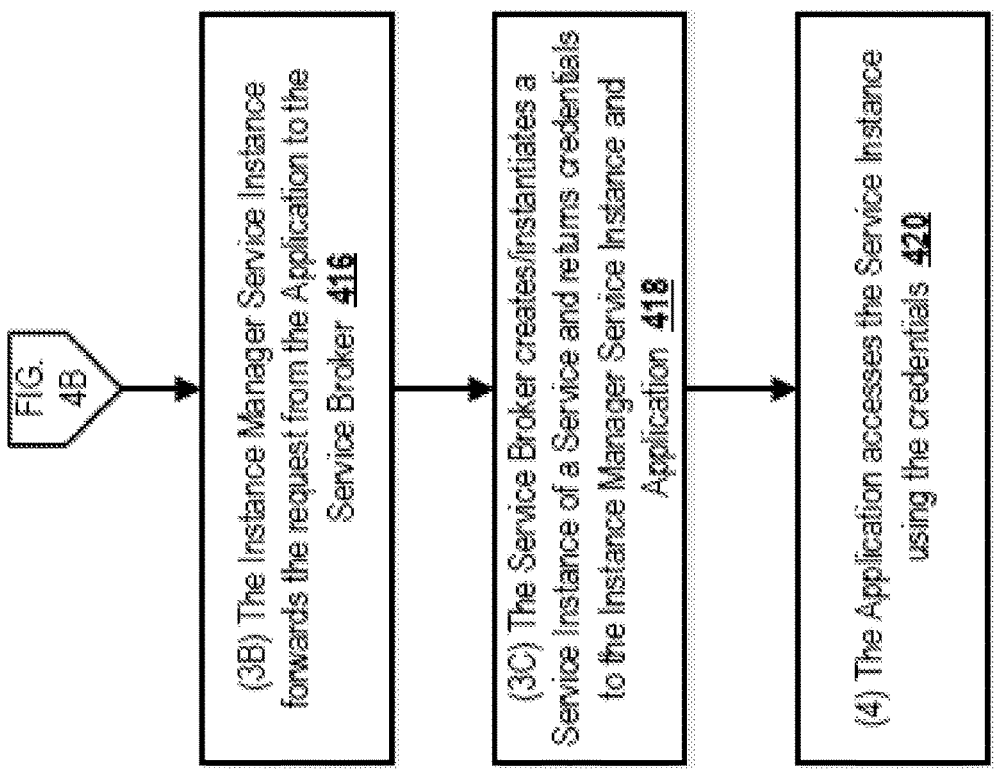

FIGS. 4A-4B represent a flowchart illustrating an example method 400 (as 400a-400b) for application Service Instance management with an instance manager, according to an implementation. For clarity of presentation, the description that follows generally describes method 400 in the context of the other figures in this description. However, it will be understood that method 400 may be performed, for example, by any suitable system, environment, software, and hardware, or a combination of systems, environments, software, and hardware as appropriate. In some implementations, various steps of method 400 can be run in parallel, in combination, in loops, or in any order.

At 402 (1A), a Service Broker 106 is registered with the Controller 104. From 402, method 400 proceeds to 404.

At 404 (1B), an Instance Manager Broker 302 is registered with the Controller 104. After the registrations at 402 and 404, the Controller 104 can offer Services from the two different brokers for use by an Application 102. From 404, method 400 proceeds to 405.

At 405 (1C), the Service Broker 106 is registered with the Instance Manager 304. Here, the Service Broker is technically registered to another Controller (here Instance Manager 304). This also means that if another particular Service 308 needs to be made available/managed, a Service Broker 106 associated with that particular Service 308 would simply register itself with the Instance Manager 304. As a result, the Instance Manager 304 is aware of available Services 308 and Service Instances 108. From 405, method 400 proceeds to 406.

At 406 (2A), Deployer 101 requests a binding of a Service Instance 306 of the Instance Manager 304 to the Application 102 by sending a request to the Controller 104. From 406, method 400 proceeds to 408.

At 408 (2B), Controller 104 forwards the request to the Instance Manager Broker 302. From 408, method 400 proceeds to 410.

At 410 (2C), the Instance Manager Broker 302 creates/instantiates the Service Instance 306 of the Instance Manager 304 and returns credentials of the Service Instance 306 to the Deployer 101. From 410, method 400 proceeds to 412.

At 412 (2D), the Deployer 101 passes the received credentials from Controller 104/Instance Manager Broker 302 to Application 102. The credentials are used to bind the instantiated Service Instance 306 to the Application 102. From 412, method 410 proceeds to 414.

At 414 (3A), on starting, the Application 102 requests that the Service Instance 306 create a service instance 108. From 414, method 400 proceeds to 416 in FIG. 4B.

At 416 (3B), the Service Instance 306 forwards the request from Application 102 to the Service Broker 106. From 416, method 400 proceeds to 418.

At 418 (3C), the Service Broker 106 creates/instantiates a Service Instance 108 of a Service 308 and returns credentials (for example, for a database the credentials could include a database schema, technical user of the database, password to the database, etc.) of the Service Instance 108 to the Instance Manager Service Instance 306 (here a calling Controller) which returns the credentials to the Application 102. From 418, method 400 proceeds to 420.

At 420 (4), the Application 102 accesses the Service Instance 108 using the received credentials. After 420, method 400 stops.

If a requested Service Instance 108 is not running when requested using valid credentials, a system component (not illustrated) can be used to start the Service Instance 108 appropriately. If a Tenant completes using the Service Instance 108, the Service Instance 108 can disconnect from the Application 102 and be reconnected following a subsequent request by the Application 102 (for example, the Tenant logs on to the Application 102 and service instance is again needed). Typically the Instance Manager 304 keeps a record of the available Service Instance 108 credentials for all registered Service Brokers 106 (the Instance Manager Service Instance 306 calls the Service Broker 106 when a new Service Instance of a Service 308 needs to be created/deleted—such as, create binding or delete binding). In this way, the Instance Manager Service Instance 306 can pass the information to the Application 102 without need to always contact the Service Broker(s) 106. After 420, method 400 stops.

Note that if a Service Instance 108 fails, the Application 102 can dynamically request that a new Service Instance 108 be created for use. The Instance Manager Service Instance 306 can reply to request a list of credentials from the Application 102 of Service Instances 108 that it manages (as the Controller 104 can respond to a similar request for static Service Instances 108 that it manages).

With respect to the discussion of Service Plans above, a Deployer 101 can choose which type of Service Plan desired for a particular service. The Deployer 101 can use a service catalog (as an example, refer to Table 1 above) detailing available Service Plans (for example, static, managed, etc.) for each service. The particular Service Plan can be sent as a parameter at 2A above in FIG. 3. When the Controller 104 receives the create request, the Controller 104 will forward the Service Plan parameter to the appropriate broker (either the Service Broker 106 or Instance Manager Broker 302) based on knowledge of the service catalog. In the case of "managed" Service Plan, the Controller 104 will forward the request to the Instance Manager Broker 302 and the request will be forwarded to the Instance Manager were an instance of the appropriate Service Instance 306 will be instantiated. The Deployer 101 will pass the Service Plan parameter to the Application 102. The Application 102 requests a Service Instance 108 from the Instance Manager Service Instance 304. Note that the Instance Manager Service Instance 304 will use the Service Plan that was requested by the Deployer 101 when the Instance Manager Service Instance 306 was created. The Instance Manager Service Instance 306 will pass the Service Plan parameter to the Service Broker 106 to instantiate the appropriate Service Instance 108 for the requested Service Plan. The Instance Manager Service Instance 306 stores the Service Plan as it was requested when Instance Manager Service Instance 306 was created. This allows the Instance Manager Service Instance 306 to inject this information later on when the Application 102 calls that Instance Manager Service Instance 306 requesting a new Service Instance 108. As written above, at this point the Application 102 can no longer change its mind and pass another Service Plan as that is already fixed with the Instance Manager Service Instance 306.

In certain approaches, each service may have its own database where the persistence containers for their tenants are created as separate schemas—all hosted within that service-specific database. While this may offer flexibility in the provision of services, one less-desirable result may be the scattered distribution of persistence containers for individual tenants across different databases.

Such per-service distribution of persistence containers of a particular tenant across multiple databases, can complicate activities such as data back-up. Moreover it can hamper desired goals such as the isolation of tenant data for security purposes, and the granting of unfettered access to individual tenant data by outside extension application(s).

Accordingly, embodiments relate to methods and apparatuses that co-locate persistence containers of different microservices of a particular tenant, within a same database. A central instance manager (IM) receives microservice requests from a common application that is shared between various tenants. The central IM associates a corresponding tenant identifier with the microservice requests. Referencing this assigned tenant identifier, the central IM maintains an external configuration file comprising a two-dimensional mapping of services (m) and tenants (n), to relevant persistence container service instances. Such mapping permits the allocation of tenant-specific microservice data for storage within persistence containers of a particular database. Co-locating data according to embodiments promotes flexibility: tenants may furnish database structures tailored to their individual needs. Consolidating microservice persistence containers within a tenant-specific database may also facilitate one or more of: the consistent and efficient backup of data, the isolation of individual tenant data for security purposes, and/or the provision of access to individual tenant data by outside extension application(s).

FIG. 5 shows a simplified view of a system configured to implement resource analysis according to an embodiment. Specifically, system 500 comprises a plurality of various tenants 502, 504, and 506, each comprising a set of individual users.

Those users are seeking to access shared application 508 that is hosted upon common services platform 510. Accordingly, the tenants issue microservices requests 512 to the platform.

The platform comprises a centralized instance manager 514. That centralized instance manager receives the services requests from applications in the context of various tenants. From those service requests, the centralized IM in turn instantiates individual service instances 516.

The centralized instance manager configuration maintains an external instance manager configuration file 518. That file 518 includes a two-dimensional mapping 520 of services (m) and tenants (n), to persistence container service instances.

While FIG. 5 shows the external IM configuration file including the 2-D m×n mapping located outside both the tenant-specific databases and the service-specific database, this is not required. Alternative embodiments could store the external IM configuration file within a service-specific database or within a tenant-specific database. The latter approach is described below in connection with the particular example of FIG. 7.

The central IM then associates a tenant identifier 522 with the service instance. That tenant ID uniquely indicates the particular tenant who is the source of the service request issued to the platform.

Referencing the external IM configuration file, based upon the tenant ID applied to the mapping the central IM determines whether the service request is being issued from a tenant having a tenant-specific database. If so, then the central IM allocates the service instance to a storage schema 524 within the appropriate tenant-specific database 526 as indicated by the tenant ID.

Alternatively, reference to the tenant ID and the external IM configuration file may indicate a service request 528 as originating from a particular tenant not having a tenant-specific database. In that case, then by default the central IM allocates the service instance to a storage schema 530 within an appropriate service-specific database 532.

It is noted that each service hosted by the platform may have its own instance manager. Thus, a service request incoming to the platform and specific to the application, may in turn result in the generation of service instances that are not specific to the application. Examples can include logging request service instances, as well as others pertaining to system-wide services.

Accordingly, FIG. 5 shows the presence of other services 550, 552, each having its own respective service instance manager 554, 556. Like the central instance manager of the application, the service IM's reference the external IM configuration file in order to determine the appropriate location for persistence containers of the service instances.

Thus where indicated by the mapping according to the tenant ID, service instances instantiated by the service IM(s) may be stored in a tenant-specific database. Otherwise, by default the instantiated service instances may be stored in a service-specific database.

Figure 6:
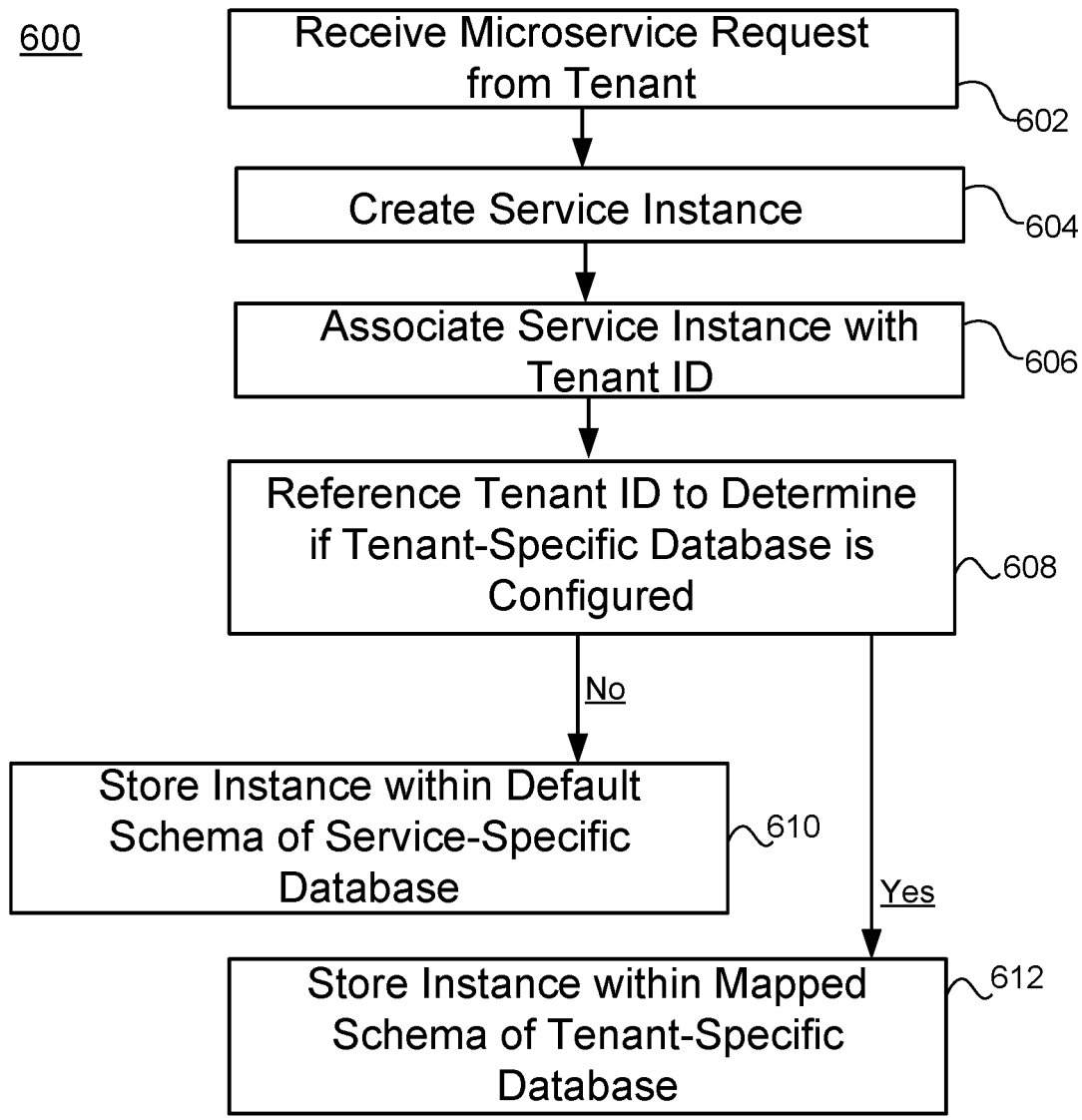
FIG. 6 shows a simplified flow diagram of a method according to an embodiment.

FIG. 6 shows a simplified process flow 600 of various actions that are taken according to an embodiment. Specifically, at 602 a microservice request is received from a tenant.

At 604, a service instance is instantiated from the microservice request. At 606 the service instance is associated with a tenant ID.

At 608, the tenant ID is referenced to determine if a tenant-specific database is configured. If not, by default at 610 the service instance is stored within a schema of a service-specific database.

However, if the tenant ID indicates the service request to be associated with a tenant having a tenant-specific database, at 612 the service instance is stored within a schema of that tenant-specific database.

In summary, externalization of the instance manager configuration allows the definition of tenant-specific databases for use by multi-tenant applications and services managing persistence containers via an IM. Such co-location of microservice persistence containers in a tenant-specific database may offer one or more benefits.

For example, embodiments may improve the reliability and accuracy of stored data. During the course of consistent backup and restore operations, having to take snapshots of tenant data across many databases can be difficult to achieve. Co-location according to embodiments avoids this issue by locating the data of the same tenant, within a same database.

Co-location according to embodiments can also impart flexibility to data access. In particular, tenants can furnish their own dedicated database to host their data.

Moreover, embodiments may allow tenants to gain access via custom extension applications, to local databases storing their own data as created by subscribed applications and services. This may be achieved, for example, by using database synonyms between database schemas within one database.

Implementing tenant-specific databases can also impart enhanced security to stored data. That is, the dedicated database is better isolated from other tenants. The level of data separation is improved from schema isolation to database isolation.

Approaches permitting the use of a tenant-furnished database may also be more cost efficient. In particular, the tenant needs to acquire only storage for one larger database rather than many small containers in different databases. Embodiments may also allow a tenant's investment in larger databases, to be shared across all multi-tenant applications and services to which the tenant subscribes Various details of implementing co-location of microservice persistence containers in a tenant database according to embodiments, are discussed below in connection with the following example.

EXAMPLE

Figure 7:
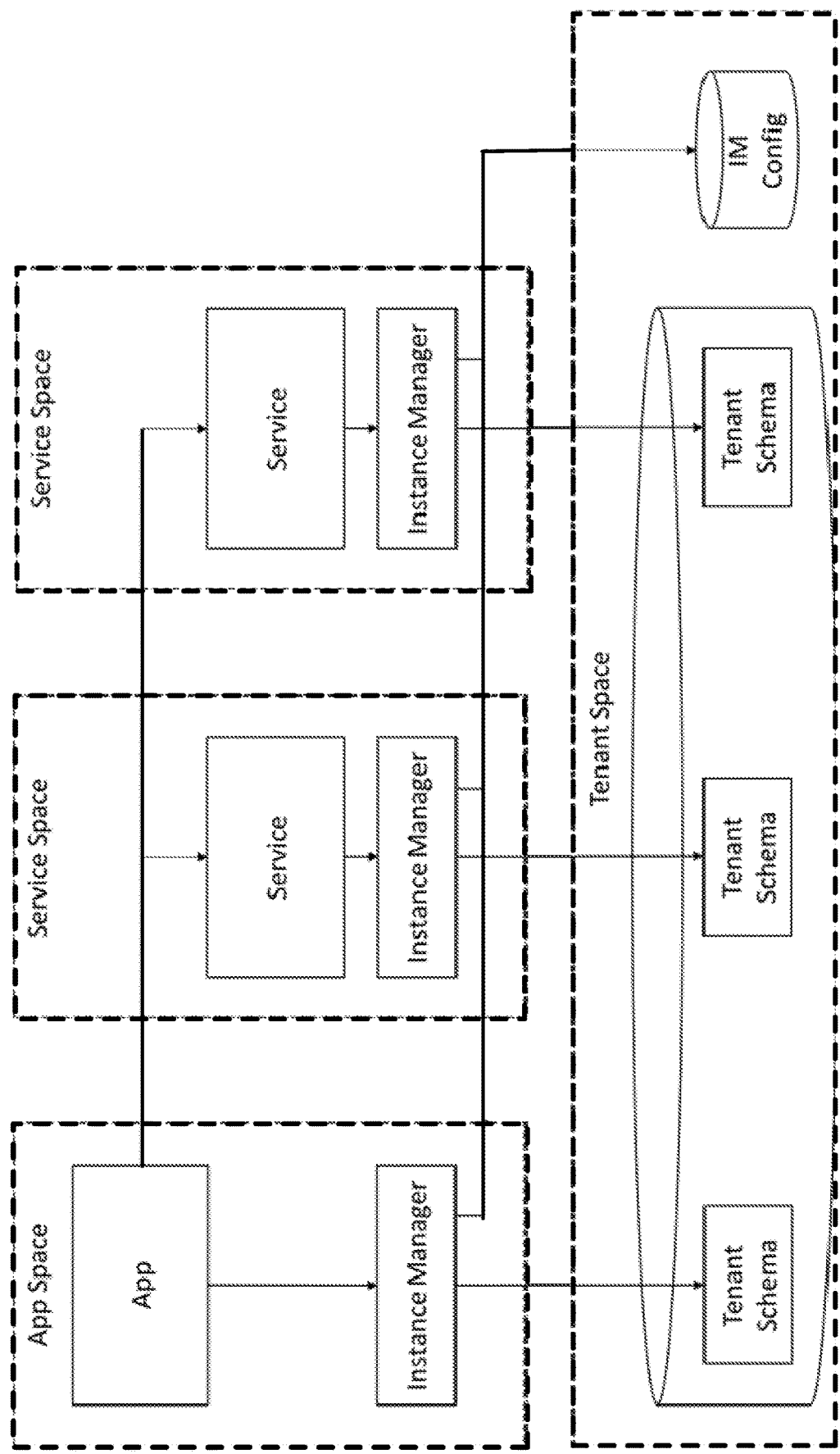
FIG. 7 shows a simplified view of a services platform according to an embodiment.

This example is now presented in connection with the Cloud Platform available from SAP SE of Walldorf, Germany. FIG. 7 shows a simplified view of a services platform 700 according to an embodiment.

In the SAP Cloud Platform, a respective instance manager (IM) 702 functions to multiplex access by multi-tenant applications and services to persistence containers. Specifically, as described previously the IM is a service that exposes a Representational State Transfer (REST) API.

The REST API can be accessed by the application or service using the service binding to its IM instance, in order to create actual service instances. These actual service instances represent persistence containers or retrieve the credentials to a specific service instance managed by the IM.

The IM provides this access directly through APIs that are called at runtime. Thus, the application can dynamically bind to any service instance managed by the IM.

As shown in FIG. 7, each application or service has its own respective IM instance. Embodiments allow tenants to configure their own database for use with all applications and services, independent of their own local default configuration.

Specifically, for the separate-database-per-tenant configuration of FIG. 7, applications and services bind their own IM instance, which delivers a first key in this mapping. A second key (the tenant ID) is passed to the IM when looking up the persistence container for a specific tenant of that application or service.

The service instance is associated with a tenant identifier to map each tenant to a specific persistence container. The persistence container lookup performed by the IM references the tenant ID first, in order to determine if a tenant specific database has been configured.

If no tenant specific database has been implemented, then the default is to determine the target database only from the IM instance. In particular, the platform is configured with the service-specific database in which persistence containers are created when a new persistence container service instance is requested.

If, however, a tenant-specific database has been implemented, the IM determines the persistence container in that tenant's database according to the IM instance. This results in a sequential determination to group persistence containers together by tenant, rather than by service.

In certain embodiments, the instance manager may be implemented by a database engine, for example as present in an in-memory database. One example of such an in-memory database engine is that of the HANA in-memory database available from SAP SE of Walldorf, Germany.

According to particular embodiments, the processing power available to an in-memory database engine may be leveraged to perform one or more aspects as have been described herein. For example, the in-memory database engine may be employed to perform one or more of the actions described above, e.g.:
instantiate an IM service instance from a received microservice request;
associate a tenant ID with the IM service instance;
reference the tenant ID and the IM configuration file to determine if a tenant-specific database is configured;
if indicated, store the IM service instance within a schema of a tenant-specific database;
if not indicated, by default store the IM service instance within a schema of a service-specific database.

Figure 8:
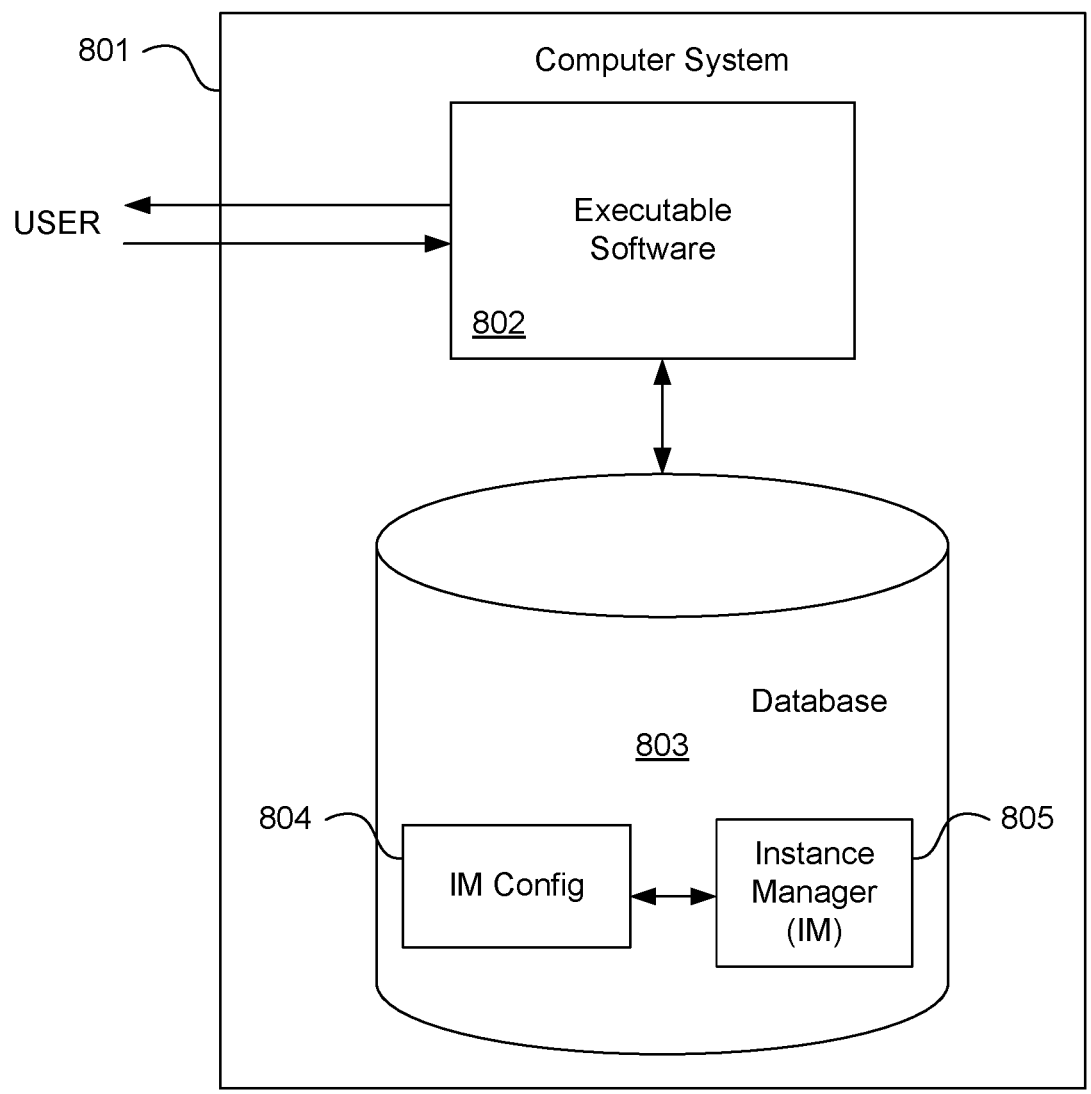
FIG. 8 illustrates hardware of a special purpose computing machine according to an embodiment that is configured to perform co-location of microservice persistence containers.

FIG. 8 illustrates hardware of a special purpose computing machine configured to implement co-location of microservice persistence containers according to an embodiment. In particular, computer system 801 comprises a processor 802 that is in electronic communication with a non-transitory computer-readable storage medium comprising a database 803. This computer-readable storage medium has stored thereon code 805 corresponding to an instance manager. Code 804 corresponds to an instance manager configuration file. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 9:
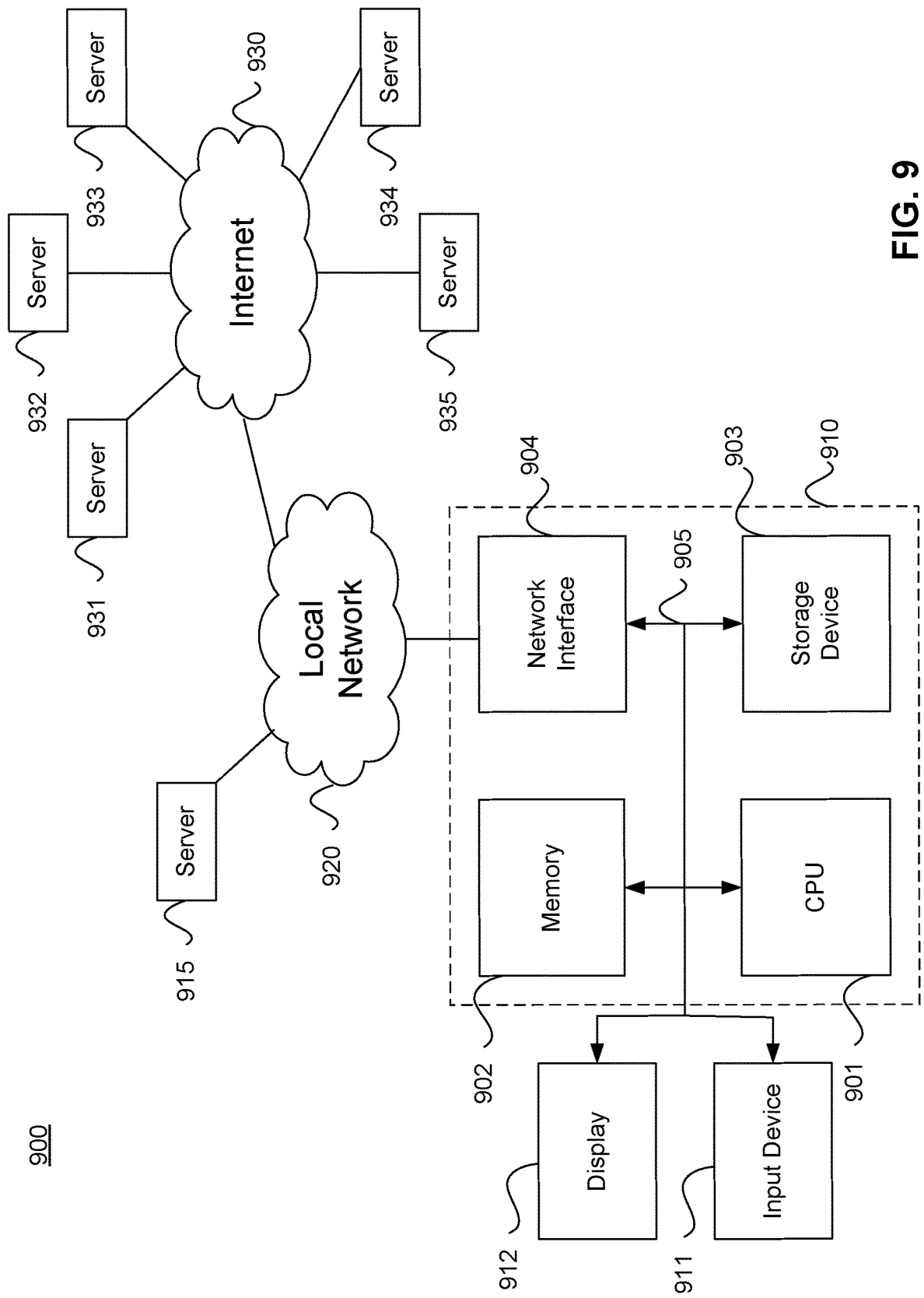
FIG. 9 illustrates an example computer system.

An example computer system 900 is illustrated in FIG. 9. Computer system 910 includes a bus 905 or other communication mechanism for communicating information, and a processor 901 coupled with bus 905 for processing information. Computer system 910 also includes a memory 902 coupled to bus 905 for storing information and instructions to be executed by processor 901, including information and instructions for performing the techniques described above, for example. This memory may also be used for storing variables or other intermediate information during execution of instructions to be executed by processor 901. Possible implementations of this memory may be, but are not limited to, random access memory (RAM), read only memory (ROM), or both. A storage device 903 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 903 may include source code, binary code, or software files for performing the techniques above, for example. Storage device and memory are both examples of computer readable mediums.

Computer system 910 may be coupled via bus 905 to a display 912, such as a cathode ray tube (CRT) or liquid crystal display (LCD), for displaying information to a computer user. An input device 911 such as a keyboard and/or mouse is coupled to bus 905 for communicating information and command selections from the user to processor 901. The combination of these components allows the user to communicate with the system. In some systems, bus 905 may be divided into multiple specialized buses.

Computer system 910 also includes a network interface 904 coupled with bus 905. Network interface 904 may provide two-way data communication between computer system 910 and the local network 920. The network interface 904 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 904 sends and receives electrical, electromagnetic, or optical signals that carry digital data streams representing various types of information.

Computer system 910 can send and receive information, including messages or other interface actions, through the network interface 904 across a local network 920, an Intranet, or the Internet 930. For a local network, computer system 910 may communicate with a plurality of other computer machines, such as server 915. Accordingly, computer system 910 and server computer systems represented by server 915 may form a cloud computing network, which may be programmed with processes described herein. In the Internet example, software components or services may reside on multiple different computer systems 910 or servers 931-935 across the network. The processes described above may be implemented on one or more servers, for example. A server 931 may transmit actions or messages from one component, through Internet 930, local network 920, and network interface 904 to a component on computer system 910. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
co-locating persistence containers of different microservices of a specific tenant, within a same database, wherein the co-locating comprises:
an in-memory database engine receiving a service request from one of a plurality of tenants sharing an application;
the in-memory database engine instantiating a service instance from the service request; the in-memory database engine determining, from a tenant identifier associated with the service request and a configuration file including a mapping, whether a tenant-specific database is configured with the one of the plurality of tenants;
if the tenant-specific database is determined to be configured with the one of the plurality of tenants, the in-memory database engine storing the service instance in a first schema of the tenant-specific database, where the in-memory database engine grants to an outside extension application, access to the first schema;
if the tenant-specific database is determined to not be configured with the one of the plurality of tenants, the in-memory database engine storing the service instance in a second schema of a service-specific database, wherein the configuration file is stored in the service-specific database;
an instance manager separate from the in-memory database engine receiving a logging request;
the instance manager receiving a parameter indicating a service plan; the instance manager instantiating a logging service instance from the logging request and the parameter; and
based upon the logging service instance and the configuration file, the instance manager storing the logging service instance in the second schema of a service-specific database, wherein,
the tenant-specific database comprises the in-memory database, and
the associating is performed by the in-memory database engine of the tenant-specific in-memory database.

2. A method as in claim 1 further comprising:
associating the tenant identifier with the service request.

3. A method as in claim 1 wherein:
the service-specific database comprises another in-memory database; and
the instance manager comprises the in-memory database engine of the service-specific database.

4. A method as in claim 1 wherein instantiating the service instance comprises calling a representational state transfer (REST) application program interface (API).

5. A non-transitory computer readable storage medium embodying a computer program for performing a method, said method comprising:
co-locating persistence containers of different microservices of a specific tenant, within a same database, wherein the co-locating comprises:
an in-memory database engine of a tenant-specific in-memory database receiving a service request from one of a plurality of tenants sharing an application;
the in-memory database engine instantiating a service instance from the service request;
the in-memory database engine associating a tenant identifier with the service instance;
the in-memory database engine determining, from the tenant identifier and a configuration file including a mapping, whether the tenant-specific database is configured with the one of the plurality of tenants;
if the tenant-specific database is determined to be configured with the one of the plurality of tenants, storing the service instance in a first schema of the tenant-specific database, where the in-memory database engine grants to an outside extension application, access to the first schema;
if the tenant-specific database is determined to not be configured with the one of the plurality of tenants, storing the service instance in a second schema of a service-specific database, wherein the configuration file is stored in the service-specific database;
an instance manager separate from the in-memory database engine receiving a logging request;
the instance manager receiving a parameter indicating a service plan;
the instance manager instantiating a logging service instance from the logging request and the parameter; and
based upon the logging service instance and the configuration file, the instance manager storing the logging service instance in the second schema of a service-specific database,
wherein,
the tenant-specific database comprises the in-memory database, and
the associating is performed by the in-memory database engine of the tenant-specific in-memory database.

6. A non-transitory computer readable storage medium as in claim 5 wherein instantiating the service instance comprises calling a representational state transfer (REST) application program interface (API).

7. A computer system comprising:
one or more processors;
a software program, executable on said computer system, the software program configured to cause an in-memory database engine of a tenant-specific in-memory database to:
co-locate persistence containers of different microservices of a specific tenant, within a same database, wherein the co-locating comprises:
receive a service request from one of a plurality of tenants sharing an application;
instantiate a service instance from the service request;
determine, from a tenant identifier associated with the service request and a configuration file including a mapping, whether the tenant-specific database is configured with the one of the plurality of tenants;
if the tenant-specific database is determined to be configured with the one of the plurality of tenants, store the service instance in a first schema of the tenant-specific database, where the in-memory database engine grants to an outside extension application, access to the first schema;
if the tenant-specific database is determined to not be configured with the one of the plurality of tenants, store the service instance in a second schema of a service-specific database, wherein the configuration file is stored in the service-specific database;

the software program further configured to cause an instance manager separate from the in-memory database engine to:

receive a logging request;

receive a parameter indicating a service plan;

instantiate a logging service instance from the logging request and the parameter; and based upon the logging service instance and the configuration file, store the logging service instance in the second schema of a service-specific database, wherein, the tenant-specific database comprises the in-memory database, and the associating is performed by the in-memory database engine of the tenant-specific in-memory database.

8. A computer system as in claim 7 wherein the software program is further configured to cause the in-memory database engine to:

associate the tenant identifier with the service request.

9. A computer system as in claim 7 wherein: the service-specific database comprises another in-memory database; and the instance manager comprises the in-memory database engine of the service-specific database.

10. A computer system as in claim 7 wherein the software program is further configured to cause the in-memory database engine to:

instantiate the service instance by calling a representational state transfer (REST) application program interface (API).

* * * * *